United States Patent [19]

Miller et al.

[11] Patent Number: 5,514,191
[45] Date of Patent: May 7, 1996

[54] POLYMERIC MEDIA AMENDMENT FOR GROWING MUSHROOMS

[75] Inventors: Deborah L. Miller; John C. Miller, both of Hawthorn Woods, Ill.; Douglas Tanner; Anastacio Andrade, both of Watsonville, Calif.

[73] Assignee: Deerpoint Industries, Inc., Hawthorn Woods, Ill.

[21] Appl. No.: 222,796

[22] Filed: Apr. 5, 1994

[51] Int. Cl.⁶ .................................................. A01G 1/04
[52] U.S. Cl. ........................................... 47/1.1; 47/59
[58] Field of Search ............................. 47/1.102, 1.104, 47/1.107, 58.09, 58.26

[56] References Cited

U.S. PATENT DOCUMENTS 3,545,130  12/1970  Strother et al. ............................. 47/58

OTHER PUBLICATIONS

Castle (1993) J. Agric. Food Chem. 41:1261–1263.
Nus (Jun. 1992) Golf Course Management pp. 26–40.
Azzam (1980) Commun. in Soil Science and Plant Analysis 11(8):767–834.

Primary Examiner—Che S. Chereskin
Attorney, Agent, or Firm—Reinhart, Boerner, Van Deuren, Norris & Rieselbach

[57] ABSTRACT

A medium for enhancing growth and availability of water during a mushroom life cycle, comprising a synthetic resin and a casing material, the resin consisting essentially of a substantially-linear water-soluble polymer capable of forming a water absorbing network within the casing material, such that the polymer is dispersed within the casing material upon exposure to water and retains water for mycelia to mushroom growth progression. Use of polyacrylamides benefits growth by retaining water, reducing evaporation loss, improving yields, and increasing product distribution into larger size ranges.

20 Claims, 5 Drawing Sheets

| | CTL1.5 | CTL1 | A-1.5 | A-1 | B-1.5 | B-1 | C-1.5 | C-1 | D-1.5 | D-1 | E-1.5 | E-1 |
|---|---|---|---|---|---|---|---|---|---|---|---|---|
| lbs/com | .208 | .168 | .153 | .184 | .206 | .234 | .234 | .214 | .148 | .157 | .182 | .176 |

FIGURE 3

|  | CTL1.5 | CTL1 | A-1.5 | A-1 | B-1.5 | B-1 | C-1.5 | C-1 | D-1.5 |
|---|---|---|---|---|---|---|---|---|---|
| Large | .033 | .037 | .021 | .052 | .023 | .065 | .036 | .083 | .044 |
| Medium | .106 | .109 | .095 | .098 | .126 | .13 | .143 | .104 | .127 |
| Small | .033 | .011 | .02 | .010 | .039 | .018 | .031 | .015 | .016 |
| Open | .036 | .011 | .017 | .024 | .018 | .021 | .024 | .012 | .011 |

FIGURE 4

|  | CTL1.5 | CTL1 | A-1.5 | A-1 | B-1.5 | B-1 | C-1.5 | C-1 | D-1.5 |
|---|---|---|---|---|---|---|---|---|---|
| Large | 15.9 | 22.2 | 13.6 | 28.2 | 11.2 | 27.9 | 15.4 | 33.9 | 22.2 |
| Medium | 51.1 | 65.2 | 62.5 | 53.4 | 61.4 | 59.8 | 61.3 | 48.4 | 64.2 |
| Small | 15.9 | 6.3 | 12.7 | 5.6 | 18.9 | 7.5 | 13.3 | 7.0 | 8.3 |
| Open | 17.1 | 6.3 | 11.2 | 13.0 | 8.5 | 8.8 | 10.0 | 5.7 | 5.5 |

POLYMERIC MEDIA AMENDMENT FOR GROWING MUSHROOMS

FIELD OF THE INVENTION

This invention is related generally to the use of linear water-soluble polymers, copolymers, and the like to improve the availability of water to mycelia during the mushroom growth cycle, when added to casing materials and used as part of the growing media.

BACKGROUND OF THE INVENTION

Mushrooms are grown commercially in the United States and elsewhere in great volumes to satisfy the culinary demand by consumers for this edible commodity. Many varieties are grown, with the well-known white/off-white mushrooms by far the most common, and more exotic varieties such as shitaki, enoki, and the like produced in lesser quantities. These fungi all present significant challenges to the grower who must duplicate the growing conditions found in nature for each variety while optimizing his production costs and efficiencies.

White mushroom fanning, as representative of mushroom production, consists of six steps: Phase I composting and Phase II composting followed by spawning, casing, pinning, and cropping, in succession. Composting involves preparation of the nutrient base (Phase I) and pasteurization/de-ammonifization (Phase II) for the mushrooms. See, Wuest, Duffy, and Royce, *Six Steps to Mushroom Fanning*, Penn State Univ., Col of Ag. Sci.—Coop. Ext. Spec. Cir. 268 circa 1979, incorporated herein in its entirety. Spawning is the process by which the grower inoculates the compost with the mushroom "spawn", (mushroom mycelia propagated vegetatively).

In Step 4, the spawn-ran compost is cased, whereby a top-dressing of selected materials (typically, clay-loam field soil, a mixture of peat moss with ground limestone, or reclaimed, spent compost) is spread uniformly over the surface of the compost on which the mushrooms eventually form. This casing is typically pre-wet to a high moisture level, and thereafter acts as a water reservoir and a place for the growth and fusion of mycelia into rhizomorphs. Without rhizomorphs, no primordia, or pins, form, and there would be no mushrooms. Uniformity of the casing over the compost is very important because it allows the spawn to move into and through the casing at the same rate. Additionally, it is critical that the casing medium be able to hold water, as the continuous availability of moisture is essential for the development of a firm, marketable mushroom of acceptable size, and, ultimately for profitable yields. Throughout the period following casing, water is applied intermittently to maintain the moisture level. Knowing when, how, and how much water to apply to the casing material is considered an art form in the industry and critical to efficient production.

Mushroom initials develop as outgrowths on rhizomorphs formed in the casing. The initials grow in size to form structures referred to as pins, which in turn continue to expand and grow through a button stage and ultimately enlarge into a mushroom. Depending upon growing conditions, mushrooms can be harvested 18–21 days after casing. Pin development can be controlled, in part, by the concentration of carbon dioxide in the atmosphere above the casing. Optimal pin development is dependent upon a time reduction of carbon dioxide concentration, along with maintenance of sufficient moisture and relative humidity. Buttons continue to develop and enlarge through the cropping period. Individual crops or "breaks" are gathered during repeating 3–5 day harvests throughout the cropping phase. Several breaks may be harvested in succession followed by a several day period in which no new mushrooms appear. This break/harvest cycle is repeated several times during cropping, which may last anywhere from 35–150 days depending on the mushroom variety and growing technique.

While each phase or step in the mushroom production process is critical to the growth cycle and the overall yields obtained, the casing Step 4 presents particular problems and the opportunity for unique solutions. One approach, used with limited success is to add the so-called "superabsorbant" polymers to the casing medium to increase moisture availability to the mushroom spawn. None of these additives have met with any degree of commercial success, due to a number of significant problems and deficiencies. First of all, the superabsorbants are highly cross-linked polymers which form gel networks, absorbing many times their weight in water. However, due to their high gel strength the superabsorbants (hydrogels) do not readily give up their water to the growing mushroom mycelia. Second, because these superabsorbant polymers are gels and water-insoluble under use conditions, they present a discontinuous lump, or water reservoir, which is only available to mycelium in the immediate vicinity of the gel network. As a result, they do not coat the peat strands. Third, at the concentrations used in mushroom production (1–3% by weight), they do not form a supply of water sufficient for the growing mushrooms and, in fact, compete with the growing mushroom mycelium for the available water supply. Fourth, they are difficult to add to the casing mixture because of their tendency to agglomerate and clump. The superabsorbants do not wet out on a peat strand and are difficult to uniformly mix throughout the casing. Finally, additives of this sort are expensive, averaging from $2.50 to $6.00 per pound, and available only at costs which unduly cut profit margins and render them unfeasible for widespread use.

In summa, a considerable number of drawbacks and problems exist in the art relating to synthetic polymers for use as additives to casings in mushroom production. Standard cultivation practices define a need for a casing material and/or an amendment which facilitates the ability of the mycelia to move therethrough and maximizes access to the available water supply.

OBJECTS OF THE INVENTION

It is an object of this invention to provide a polymeric system for use as a water management agent, overcoming the problems and deficiencies of the prior m, some of which are described above.

It is also an object of this invention to provide, generally, a polymeric system which functions either alone or in conjunction with a growth medium matrix to enhance crop production.

Another object of this invention is to provide a polymeric system for use during one or more stages of mushroom production to improve water management and crop yields.

Another object of this invention is to provide a polymeric system for use with a growing matrix, the system including a water-soluble polymer which absorbs and retains water.

Another object of this invention is to provide a polymer with a cross-linking aspect quantitatively and/or qualitatively less than that which would render it water-insoluble when used in conjunction with a growth medium.

Another object of this invention is to provide a substantially non-cross-linked polymer which is soluble in water at concentrations used with casing materials and related growth media, such that it is dispersible, more or less homogeneously throughout the media.

Another aspect of this invention is to provide a substantially linear polymeric system which absorbs moisture, but releases it in amounts sufficient to facilitate and improve uniform growth.

Another object of this invention is to provide a linear, water-soluble polymer and method for use thereof with a variety of growth and nutrient media, such that added water is initially retained upon introduction and subsequently held therein, thereby inhibiting loss through evaporation.

Another object of this invention is to provide a growth medium with enhanced water management and related performance properties such that media volumes may be reduced.

Another object of this invention is to provide a medium for mushroom and other agricultural crop production, a medium having increased water absorbing, retention, and release capabilities.

Another object of this invention is to provide a medium and method for using such which improves the rate and uniformity of growth therethrough.

Another object of this invention is to provide a growth medium and/or polymeric system which can be used in conjunction therewith, whereby the polymeric system and/or medium can be synthetically- and/or quantitatively-modified to meet predetermined performance parameters, notwithstanding other media constituents and physical characteristics.

Other objects, features, and advantages of the present invention may be readily apparent from the following description of the preferred embodiments thereof, taken in conjunction with the accompanying examples and figures.

SUMMARY OF THE INVENTION

This invention is directed to a medium and/or casing material, and method for preparing the same, for enhancing mycelia growth and increasing mushroom yield. The invention overcomes certain well-known problems and deficiencies, including those outlined above. Utilizing the water-soluble polymeric resins described herein in mushroom cultivation reduces the amount of casing material required to bring successive breaks to harvest. Through a unique interaction with the casing material, the soluble polymers absorb and retain water, and concomitantly facilitate mycelia movement through the casing. Yield and/or cap size can be seasonally optimized through preferential control of polymer concentration and related media conditions.

In part, the present invention is a medium for enhancing growth and availability of water during a mushroom life cycle. The medium includes a synthetic resin and a casing material. The resin is essentially a substantially-linear water-soluble polymer capable of forming a water-absorbing network with and/or within the casing material, such that when dispersed within the material and upon exposure to water, the polymer resin retains water for mycelia growth. The polymer is prepared from monomers selected from but not limited to the group consisting of acrylic acid, methacrylic acid, maleic anhydride, the carboxy functional equivalents of these acids and anhydrides, as well as combinations of the acids, anhydrides, and their functional equivalents. As such, the polymer can be either a copolymer or homopolymer. In preferred embodiments, the water-soluble polymer is a homopolymer of acrylamide.

In preferred embodiments, the polymer is present in an amount equivalent to about 0.1–5.0 weight percent of the medium. In highly preferred embodiments, the polymer, whether a copolymer or a homopolymer, is about 0.5–2.0 weight percent of the medium. The casing material used in conjunction with a polymer is selected from but not limited to the group consisting of peat moss, compost, reclaimed compost, field soil, and combinations thereof. In preferred embodiments, a homopolymer of acrylamide is present in an amount equivalent to about 0.1–5.0 weight percent. In highly preferred embodiments, the medium includes a peat moss with about 0.5–2.0 weight percent acrylamide homopolymer dispersed therein.

Likewise, the invention includes a casing material for facilitating mycelia development. The material includes a synthetic resin dispersed in peat moss, the resin consisting essentially of a substantially linear, water-soluble acrylamide homopolymer, such that mycelia grow through the material along the homopolymer dispersed therein. In preferred embodiments the acrylamide homopolymer is present at about 0.1–5.0 weight percent of the material, which can also include ground limestone for the purpose of effecting pH control. In highly preferred embodiments, the acrylamide homopolymer is about 0.5–2.0 weight percent.

In part, the invention includes a method for promoting mushroom development from a spawn medium, including (1) providing a casing material selected from the group consisting of peat moss, compost, reclaimed compost, field soil, and combinations thereof, (2) dispersing within the casing material a substantially linear water-soluble polymer capable of forming a water-absorbing network within the casing material; and (3) applying water to the casing materials such that the water is absorbed by the polymer for subsequent release responsive to mushroom growth. As described in conjunction with the media and casing materials of this invention, the water-soluble polymer used in conjunction with the method is prepared from monomers selected from the group consisting of acrylic acid, methacrylic acid, maleic anhydride, carboxy functional equivalents of the acids and anhydrides, and combinations of the acids, anhydrides, and their functional equivalents. The method can be employed whether the water-soluble polymer is a copolymer of at least two monomers or a homopolymer. In preferred embodiments, the method utilizes peat moss as a casing material with acrylamide homopolymer dispersed therein in an amount equivalent to about 0.1–5.0 weight percent of the peat moss. The water-soluble polymer can be dispersed within the casing material by physical mixing. Alternatively, the polymer is dissolved in water and dispersed within the material in an aqueous solution.

As discussed above, a casing material is typically applied as a layer over a spawn-ladden compost base to serve as a water reservoir conducive to rhizomorph formation. Notwithstanding grower preference and the requirements of individual mushroom varieties, the casing of choice is peat moss applied as a 1.5"-layer over the compost surface. The polymeric resins of this invention improve the water management characteristics of the casing material, whether it derives from compost, recycle compost, peat moss, field soil or any combination thereof. The polymers absorb and, more importantly, make water more available for the mycelia-rhizomorph-mushroom growth progression.

The advantages available through use of this invention are best realized through a homogeneous dispersion of such a polymer throughout the casing material. Uniform polymer distribution, in turn, provides an even supply of water throughout the casing, thereby promoting uniform growth rates throughout. The polymer can be admixed with the casing or introduced thereto by way of an aqueous solution. While both introductory routes may be employed with beneficial effect, best results are obtained by admixing dry polymer to dry casing material. As shown in the examples of the invention which follow, the beneficial effect can be observed directly by the increased water retention of the peat-polymer media and by a reduction in loss of water from the casing bed due to evaporation.

From a practical, economic standpoint, increases in the water retention capacity of the casing can decrease the amount of casing required by about one-third, as reflected in a 1.5" versus 1.0" layer over a compost base, without loss of yield. As described more fully below and through the examples of the invention, yields are enhanced with a decrease in casing volume. In as much as the casing material represents a significant portion of production costs, volume reduction through use of the invention provides a decided economic benefit not otherwise available. Even if casing volumes are not reduced the polymers described herein can be employed, nonetheless, to increase water loads and overall yields.

As further described in the examples which follow, and with reference to the preferred acrylamide homopolymer, maximum yields are observed at a dosage of 1.0 weight percent, as used in conjunction with a peat depth of 1.5". In addition to increased yield, an increase in mushroom size (large and medium) is also observed, with a corresponding decrease in small size and opens. A dosage of 0.5 weight percent (1.5" depth, peat) is not observed to impact yield significantly. At dosages of 2.0 weight percent and greater (1.5" depth, peat) overall yields are observed to decrease slightly versus the control. However, at these higher concentrations there is a relative increase in mushroom size (large and medium), similar to that observed at a 1.0 weight percent dosage.

The methodology employed to generate the data discussed above did not include a preferred picking technique by which the casing material is periodically "scratched" to accelerate the growth process, as manifested through higher yields and a larger product distribution in the medium and large mushroom size range. The results observed indicate yields and relative distributions to the large and medium size ranges would be enhanced even further through implementation of this technique. Even so, production is markedly improved without scratching and the associated costs of manual labor.

By way of comparison, and as further illustrated in the following examples, at reduced casing volumes (1.0" depth, peat) the optimum dosage range for the preferred acrylamide homopolymer is about 0.5–1.0 weight percent. At a dosage of 0.5 weight percent (1.0" depth, peat) significant increases in yields are realized with distribution directed toward the larger size ranges. At a dosage of 1.0 weight percent (1.0" depth, peat), significant increases in yields are also observed, in addition to an extremely large increase in the relative number of large-sized mushrooms. At dosages of 2.0 weight percent and greater, yields decrease relative to the control. As observed with use of the polymers of this invention with normal peat volumes (1.5" depth, peat) higher polymer concentrations direct the product distribution to the larger size ranges. This effect by the preferred acrylamide homopolymer is more pronounced at reduced casing volumes (1.0" depth, peat).

From the foregoing and through use of the media, casing material, and methods of this invention, the mushroom growth process can be modified and controlled to meet various yield and size objectives. For example, market demands during various holiday seasons place premium prices on the larger mushroom sizes. Casing materials and cultivation methods can be engineered and designed to direct mushroom growth and optimize product size distribution. Nonetheless, overall yields are increased regardless of the relative increase of product within the larger size ranges, thus increasing profits and the margin over fixed costs.

As described above, the present invention includes use of substantially linear, water-soluble polymeric resins to manage the uptake, retention, and release of water to mycelia during mushroom growth. As used herein, the term substantially linear encompasses some degree of cross-linking between polymeric chains, but less than that inherent to the hydrogel superabsorbant polymers of the prior art and less than that which would render the polymers of this invention water insoluble under and about the range of use conditions described herein. The water solubility of such polymers promotes homogeneous dispersion throughout the casing material, thereby ensuring an even water load throughout such that uniform growth is achieved. Having a substantially linear morphology, as contrasted to the extensive, three-dimensional cross-linking of the superabsorbants, it is surprising that these polymers retain water as well as and often better than the superabsorbant cross-linked polymers of the prior art. (See Table 4.) However, unlike superabsorbant polymers the linear polymers of the present invention release the retained water in response to mycelia growth. As such, they are readily distinguished over the insoluble cross-linked polymers which, due to their inherent high-gel strength, appear to compete with mycelia for moisture under growth conditions.

Polymers meeting the above requirements include, without limitation, acrylic acid homopolymers and copolymers thereof with methacrylic acid, maleic anhydride, and the like. Various other alkyl-substituted derivatives of such monomers may be incorporated into the polymer, with equal effect, so long as the water-solubility and linear morphology requirements are met. The carboxy functionalities of such co- and homopolymers can be modified to meet various performance requirements, without deviating from the scope of this invention. The acid esters, acid salts, amides and other synthetic equivalents of the carboxy functionality can be incorporated into the polymeric material to provide a variety of anionic, cationic, and non-ionic resins. Synthetic equivalents are those which upon hydrolysis or a similarly-directed chemical reaction provide the carboxy functionality. The synthetic equivalents can be further chemically-modified to meet certain physical and performance requirements. For example, an especially useful cationic resin is a co- or homopolymer of acrylamide, wherein the amide moiety is treated in succession with formaldehyde/formalin, then a trialkylamine to provide a Mannich-type quaternary mine (Mannich Quat).

The efficacy of these linear, water-soluble polymers as water retention agents was demonstrated as shown in the examples and tables provided below. Under conditions simulating step 4 of the standard mushroom production process, media/casing materials containing a dispersion of such polymers performed in accordance with the invention, in contrast to insoluble and/or non-absorbing resins. Water retention/evaporation inhibition is a critical factor in the consideration of a useable media amendment. The preliminary water loss results and the observed uniform dispersion were confirmed by the enhanced yield size distribution recorded. (See Example 5).

The polymers described as part of this invention would not seem appropriate for use in mushroom growth media. It is conventional wisdom that because linear water-soluble polymers do not form water-absorbing gels, they are restricted to use as soil conditioners, by way of aggregating the soil, combating erosion and/or improving percolation. It would seem improbable that such polymers could be employed effectively to promote mushroom growth and development. The use of linear, water-soluble polymers in this manner and as disclosed herein is contrary to the state of the art, and the results obtained were quite unexpected. Without advancing any one theory or explanation it appears that these polymers when used with casing materials sufficiently absorb water, but not to the extent as do their cross-linked hydrogel counterparts. Rather, water is released responsive to osmotic pressures generated as a result of mycelia growth. In addition, without limiting the invention, it is thought that linear polymer morphology within the casing functions as a template or network for mycelia growth. Increased availability of water provides for greater yields and larger size distribution. Ease of movement through the casing material promotes faster, even growth, which is manifested by itself in a more uniform product size and distribution toward the larger, premium size ranges.

The following non-limiting examples illustrate these and other features of the invention.

EXAMPLES OF THE INVENTION

EXAMPLE 1

Various polymers (Poly A–I, below) were evaluated under conditions simulating a generalized step 4 of the standard mushroom growth cycle to determine their potential as growth media amendments, specifically as water retention agents. The methodology included the following steps: (1) control was established using 100 grams of peat moss and 300 grams of water to reproduce adding an excess amount of water to the peat. Peat moss of the type used herein and by commercial mushroom growers can be obtained from Lakeland Peat Moss, Ltd. of Edmunton, Alberta, Canada under the designation, Lakeland Professional Grower Bale, Canadian Sphagnum Peat Moss. The control was allowed to hydrate for 18 hours to assure maximum uptake (swelling) of the peat with water; (2) the subject polymers were evaluated by substituting 1 gram of polymer solids for 1 gram of peat, to provide a 1% polymer addition rate, based on dry weight of peat. For example, a typical polymer candidate of 100% polymer solids was evaluated in a mix consisting of: 99 grams peat, 1 gram polymer, and 300 grams water. For polymers having less than 100% solids, correspondingly more polymer was added to reach the 1% loading (of polymer solids) to dry weight of peat. Each polymer/peat/water mixture was also allowed to hydrate for 18 hours. (See description of control and Poly A-Poly I, below), (3) after hydrating for 18 hours, each test sample was gravity filtered to determine excess water, if any, not retained by the peat/polymer medium. A porous filter paper permitted the water-soluble, high molecular weight polymers to pass through the paper if not retained in the peat/polymer/water medium to allow determination of the suitability of each polymer candidate as a water retention agent; and (4) excess water, not retained within the peat/polymer/water medium by each subject polymer was weighed, then subtracted from the total weight of water originally added to the mixture to obtain "retained water." Percent retained water was calculated by comparing "retained water" by total water initially added to the system.

The media compositions and results derived therefrom (Table 1) are as provided below:

CONTROL 100 grams peat 300 grams water

POLY A 99 grams peat 1 gram high molecular weight (~15,000,000) polyacrylamide 300 grams water POLY B 99 grams peat 1 gram high molecular weight (~12,000,000) polyacrylic acid 300 grams water POLY C 99 grams peat 78.9 grams of 3.8% high molecular weight (~15,000,000) polyacrylamide Mannich Quat (formaldehyde/trimethylamine) dissolved in water 212.1 grams water POLY D 99 grams peat 1 gram polyethylene glycol (PEG 3350, MW ~3,350) 300 grams water POLY E 99 grams peat 1 gram medium molecular weight (~150,000) polyvinyl alcohol 300 grams water POLY F 99 grams peat 2 grams high molecular weight (~20,000,000) acrylamide/sodium acrylate copolymer (latex emulsion) 1 gram ethoxylated (9 mole) nonyl phenol (inversion agent) 298 grams water POLY G 99 grams peat 3 grams low molecular weight (~10,000) sodium acrylate polymer (30% polymer solids) 298 grams water POLY H 99 grams peat 1 gram high molecular weight (~12,000,000) acrylamide/sodium acrylate copolymer 300 grams water POLY I 99 grams peat 1 gram (Superabsorbant) high molecular weight (~15,000,000) highly cross-linked sodium acrylate polymer 300 grams water

TABLE 1

| Polymer | Water Retention (%) | Polymer | Water Retention (%) |
| --- | --- | --- | --- |
| CTRL | 61 | Poly E | 64 |
| Poly A | 100 | Poly F | 100 |
| Poly B | 100 | Poly G | 72 |
| Poly C | 100 | Poly H | 100 |
| Poly D | 67 | Poly I | 89 |

The results show that the polymers/media/casing materials of the present invention retain an initial load of water significantly better than those of the prior art. Retention characteristics are crucial to successful mushroom cultivation. In contrast and under the experimental conditions described above, it was observed that Poly D and Poly E (polyethylene glycol and polyvinyl alcohol) performed only marginally better than the peat moss control without a polymeric amendment. Likewise, the superabsorbant/hydrogel of the prior art (Poly I) retained less water than the water-soluble linear polymers. The performance of Poly G is attributable to the relatively low molecular weight and excessive water solubility. Without limiting the invention, linear polymers having molecular weights greater than about 100,000 appear to provide the preferred combination of chain length and water solubility, while those above 500,000 are highly preferred from both a practical and performance perspective.

EXAMPLE 2

Using a methodology similar to that described in Example 1, (six hour hydration period; percent water retention measured after one-half hour via gravity filtration), various mounts (weight percentages) of a preferred polyacrylamide homopolymer were mixed with peat moss to determine the effect on water retention. As shown in Table 2, below, the polyacrylamide enhanced water retention versus the control at 0.5, 1.0, and 1.35 wt. %, the latter tested with a 25% reduction in peat volume.

TABLE 2

| Sample | Water Ret. (%) |
| --- | --- |
| A | 87.3 |
| B | 94.8 |
| C | 100 |
| D | 96.1 |

SAMPLE A (CONTROL) 80.0 grams peat 120.0 grams water

SAMPLE B (0.5% polyacrylamide based on dry peat moss) 79.6 grams peat 0.4 grams polymer 120.0 grams water SAMPLE C (1.0% polyacrylamide based on dry peat moss) 79.2 grams peat 0.8 grams polymer 120.0 grams water SAMPLE D (peat reduction with 1.35% polyacrylamide based on dry peat moss) 59.2 grams peat 0.8 grams polymer 120.0 grams water

EXAMPLE 3

Evaporation of moisture from casing material is a significant impediment to Step 4 mycelia growth. To illustrate the ability of the water-soluble polymers of this invention to retain water and reduce evaporation, water/polymer/peat mixtures were evaluated against water, water/polymer, and water/peat controls. Each of Samples A–E, below were placed in tared polyethylene dishes (5" depth), kept at room temperature and weighted periodically over a 200-hour period. Incremental weight loss (grams) comparisons are shown graphically in FIGS. 1a–d. Final weight loss (198 hours/8.25 days) comparisons are provided below.

TABLE 3

| Sample | % wt. loss |
| --- | --- |
| A | 94.9 |
| B | 88.8 |
| C | 91.6 |
| D | 73.4 |
| E | 84.9 |

Sample A (Water Control) 150.0 grams water

Sample B (Water/Acrylamide Homopolymer Control) 75.0 grams 2% polymer in water 75.0 grams water Sample C (Water/Peat Control) 150.0 grams peat 150.0 grams water Sample D (Water/Peat/Polyacrylamide) 148.5 grams peat 1.5 grams polymer 150.0 grams water (1% polymer based on dry wt. of peat)

Sample E (Water/Peat/Polyacrylamide) 148.5 grams peat 75.0 grams of 2% polymer in water 75.0 grams water (The 75.0 grams of polymer in water was poured on top of the peat after the first 75.0 grams of water was added.)

Comparison of Samples A and B (see FIG. 1a) demonstrate the colligative effect of water through introduction of a polymeric solute. Comparison of Samples A and C (FIG. 1b) shows peat moss, alone, does not significantly reduce the extent and rate of evaporation.

Samples C and D (FIG. 1c) demonstrate that solid acrylamide homopolymer (1%) admixed with dry peat affords a significant evaporation reduction. Comparison of Samples D and E (FIG. 1d) shows the additional benefit from dry polymer admixture, rather than by way of an aqueous solution, even though evaporation in the later (Sample E) is still reduced compared to peat moss, alone (Sample C).

EXAMPLE 4

A substantially-linear (non-cross-linked) polyacrylamide (available under the tradename DPI-P8000 from Deerpoint Industries of Hawthorn Woods, Ill. and elsewhere, as known to those skilled in the art) was tested against a number of commercially-available "superabsorbant" polymers, all of which are structurally characterized as being highly cross-linked, by way of comparing water retention properties. All comparisons were conducted using 1:1 (w/w) peat and water. The control was composed of peat and water, only. All of the samples were prepared using 1% (by wt. of peat) of the polymer indicated. Water retention was determined by % wt. loss, under the conditions specified in Example 3, after 261 hours.

TABLE 4

| Sample | % Wt. Loss |
| --- | --- |
| A | 93.3 |
| B | 85.7 |
| D | 81.9 |
| 1 | 80.6 |
| 8 | 80.7 |
| 11 | 83.3 |
| 12 | 85.3 |

Sample A (CONTROL)

Sample B (DPI-P8000, linear polyacrylamide)

Sample D (HYCHEM AP200A Large, Cross-Linked Sodium Polyacrylate)

Sample 1 (HYCHEM AP200C Fines, Cross-Linked Sodium Polyacrylate)

Sample 8 (STOCKHAUSEN 400K Normal, Cross-Linked Potassium Polyacrylate)

Sample 11 (STOCKHAUSEN 400F Fines, Cross-Linked Potassium Polyacrylate)

Sample 12 (STOCKHAUSEN 410K, Cross-Linked Potassium Polyacrylate)

EXAMPLE 5

Based on the results from the evaporation/water retention studies discussed above, field trials were conducted on trays of spawn-run compost, using peat moss casing at uniform depths of 1.0 and 1.5". Controls of (CTL) peat alone were compared against casing prepared with varying concentrations of a preferred substantially linear acrylamide homopolymer dispersed manually within the peat moss, although other acceptable mixing techniques may be used. (The subject polymer may be dispersed mechanically, either dry or by way of an aqueous solution, through use of a polymer educter or a similar type of device, as well-known to those skilled in the art.) With reference to the test tray descriptions, below, the total pounds of mushrooms produced, actual yield by size, and percent yield by size are provided in FIGS. 2–4, respectively. All other experimental parameters were maintained as constant throughout and as between the trays, including water volume and frequency. Scratching techniques were not implemented but would be expected to increase yields and size distribution. The total poundage of mushrooms picked in three (3) breaks was divided by the total net weight of compost used for those trays. Likewise, actual yields (by size) were calculated with reference to the net weight of compost. Percentage of yields by size were normalized to 100% irrespective of total actual yields. Tests A-1 and A-1.5 were conducted using polyacrylamide sprinkled on the compost base, as compared to mixing uniformly through the casing medium.

TABLE 5

Figure 1A:
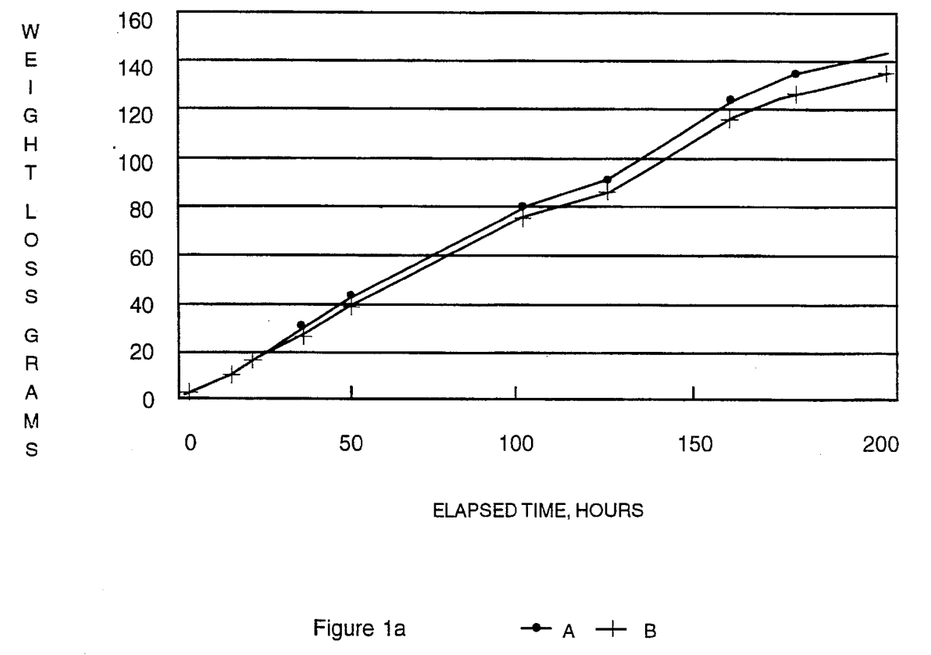
FIG. 1a graphically illustrates, by comparison, weight loss through evaporation of water, showing reduced loss of water through use of acrylamide homopolymers, in accordance with the present invention.
Figure 1B:
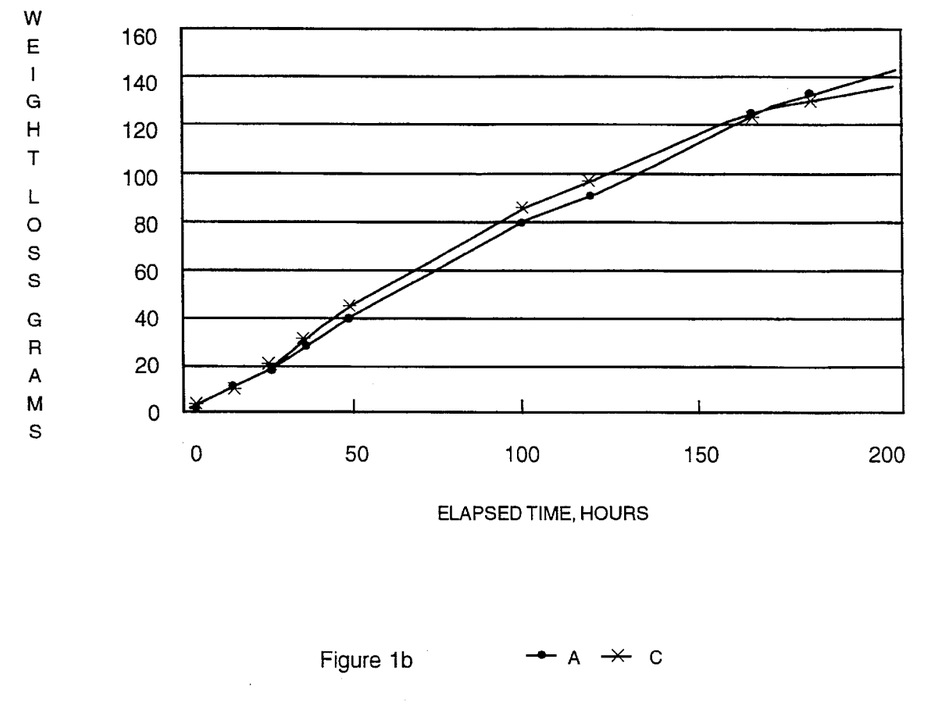
FIG. 1b extends the weight loss comparison.
Figure 1C:
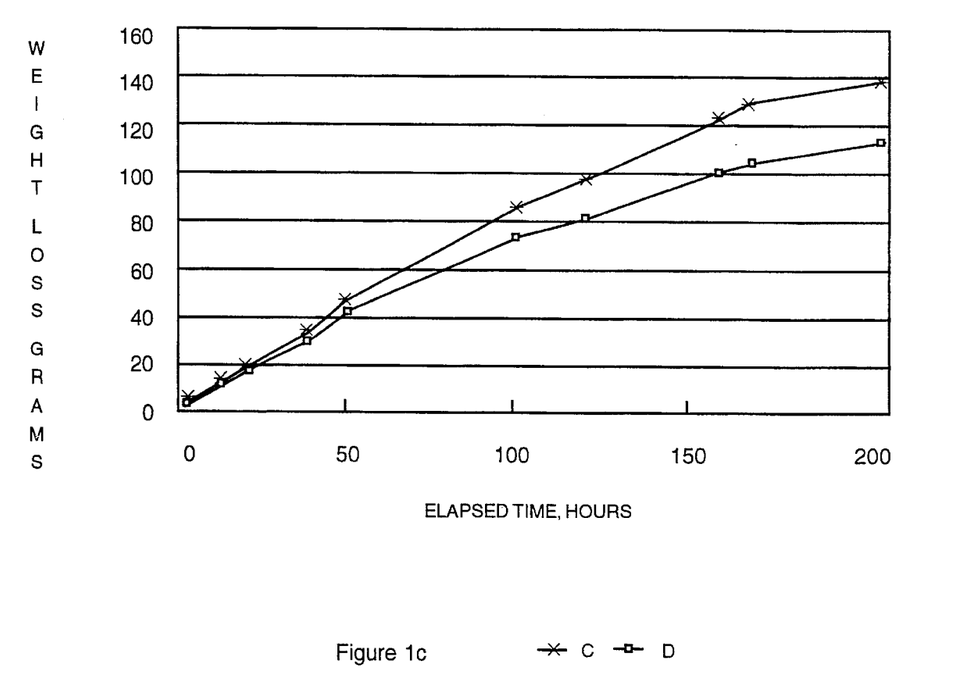
FIG. 1c also extends the weight loss comparison.
Figure 1D:
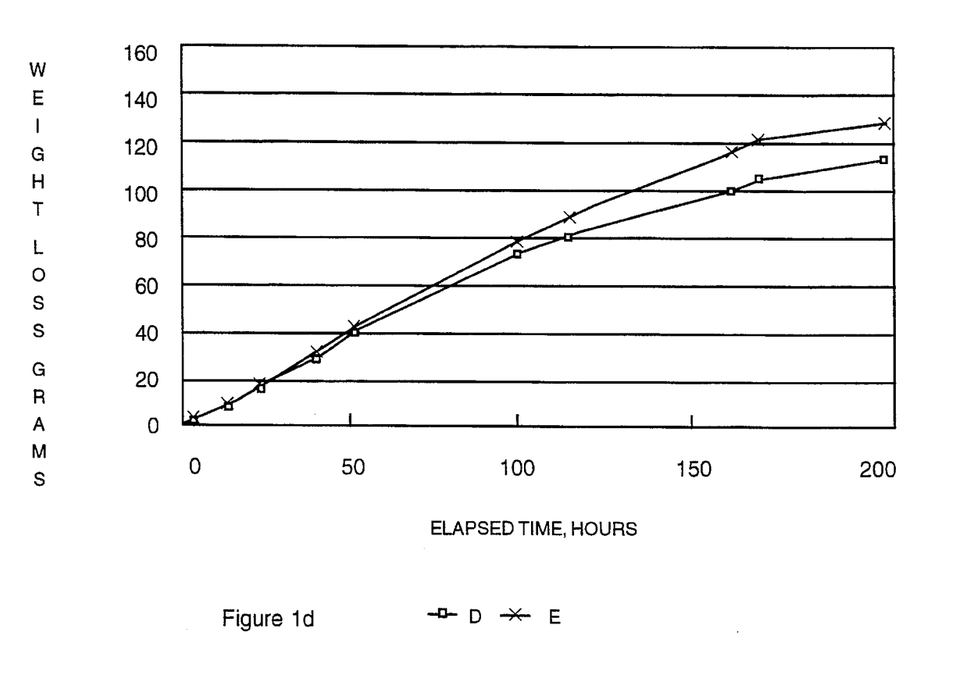
FIG. 1d further extends the weight loss comparison.
Figure 2:
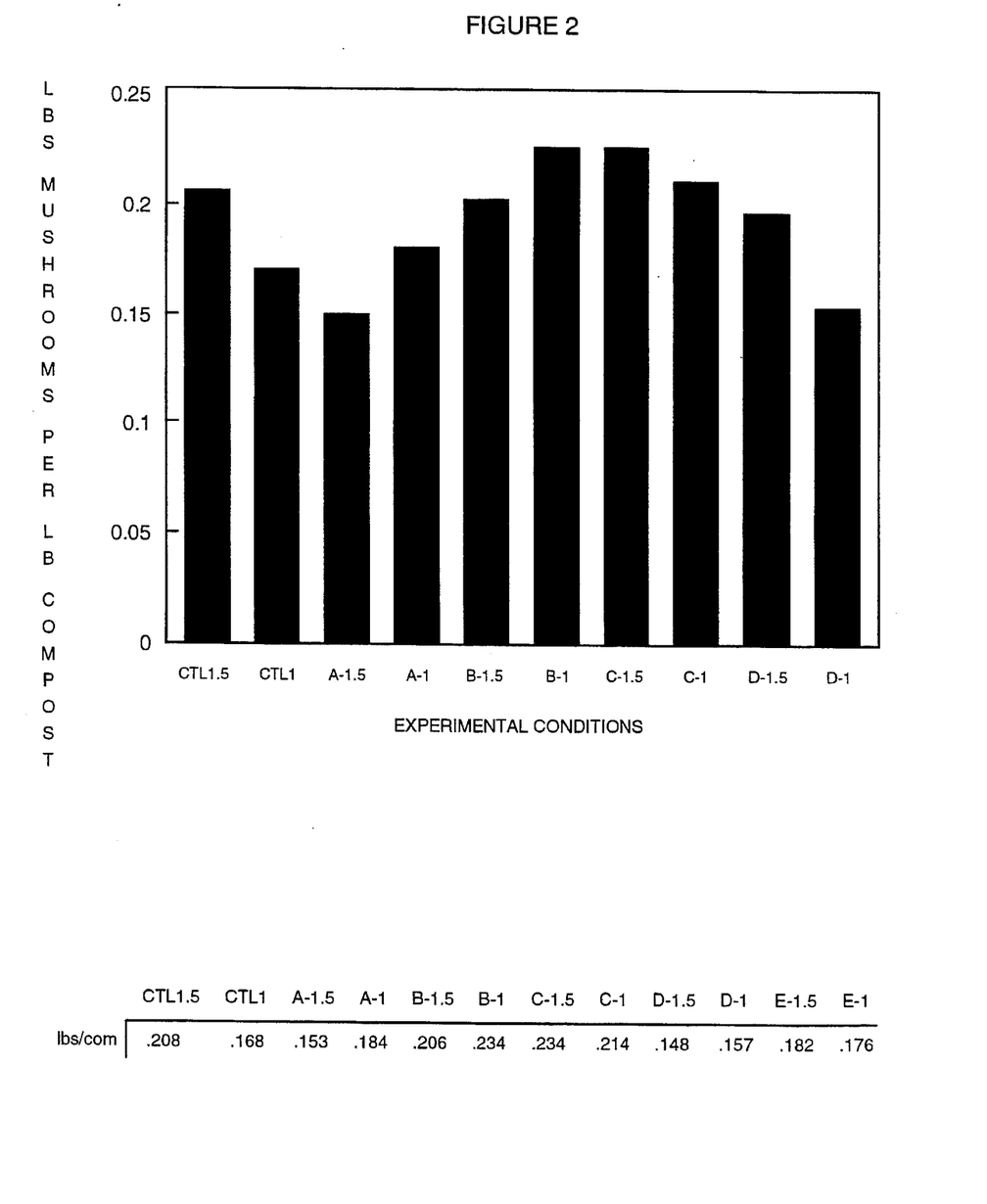
FIG. 2 shows graphically total actual pounds (lbs) of mushrooms produced per pound of compost (corn), comparing media incorporating a preferred polyacrylamide of the present invention with controls (lacking polymeric amendments)
Figure 3:
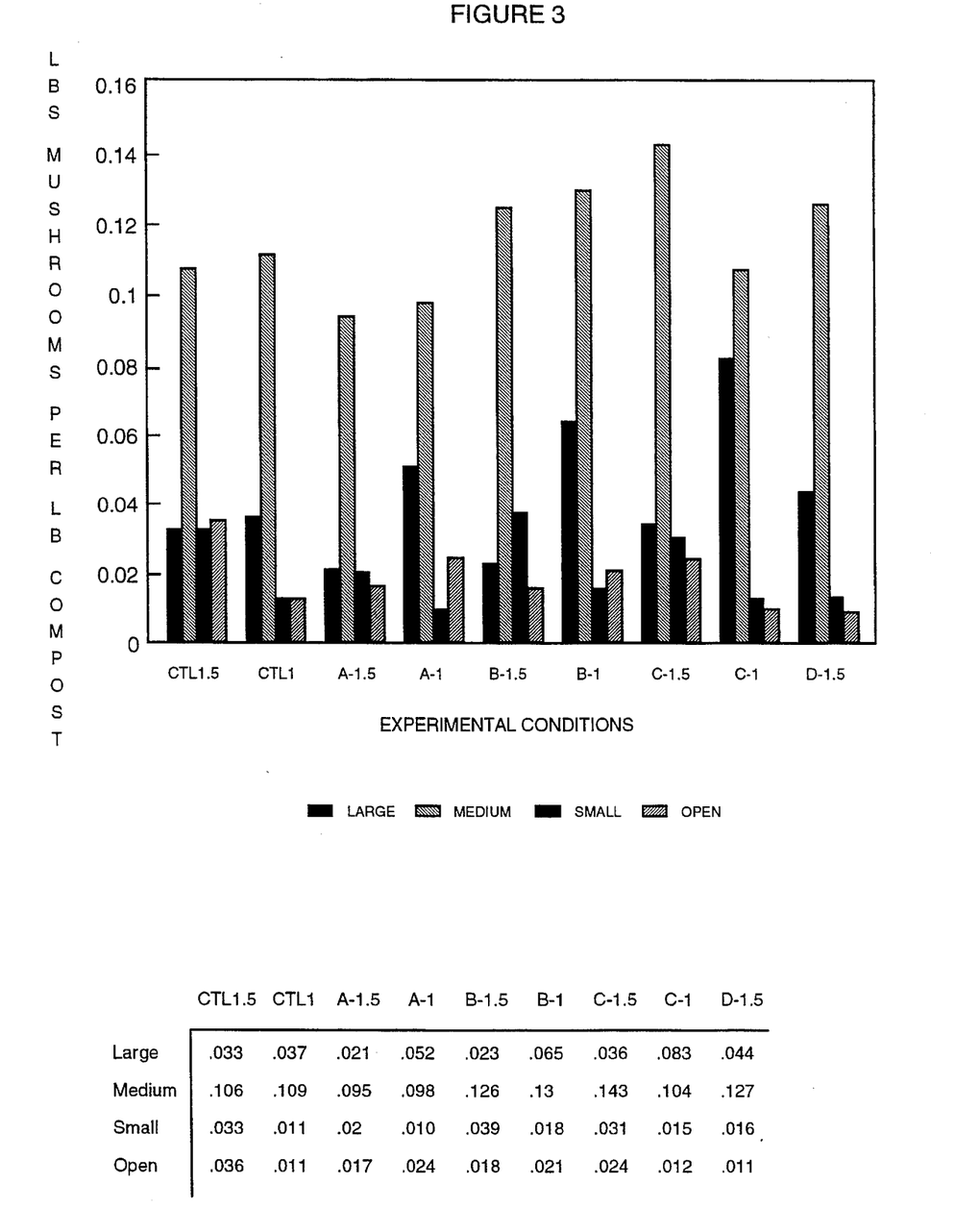
FIG. 3 graphically extends the comparisons of FIG. 2 to size distribution in terms lbs. of mushrooms per lb. of compost.
Figure 4:
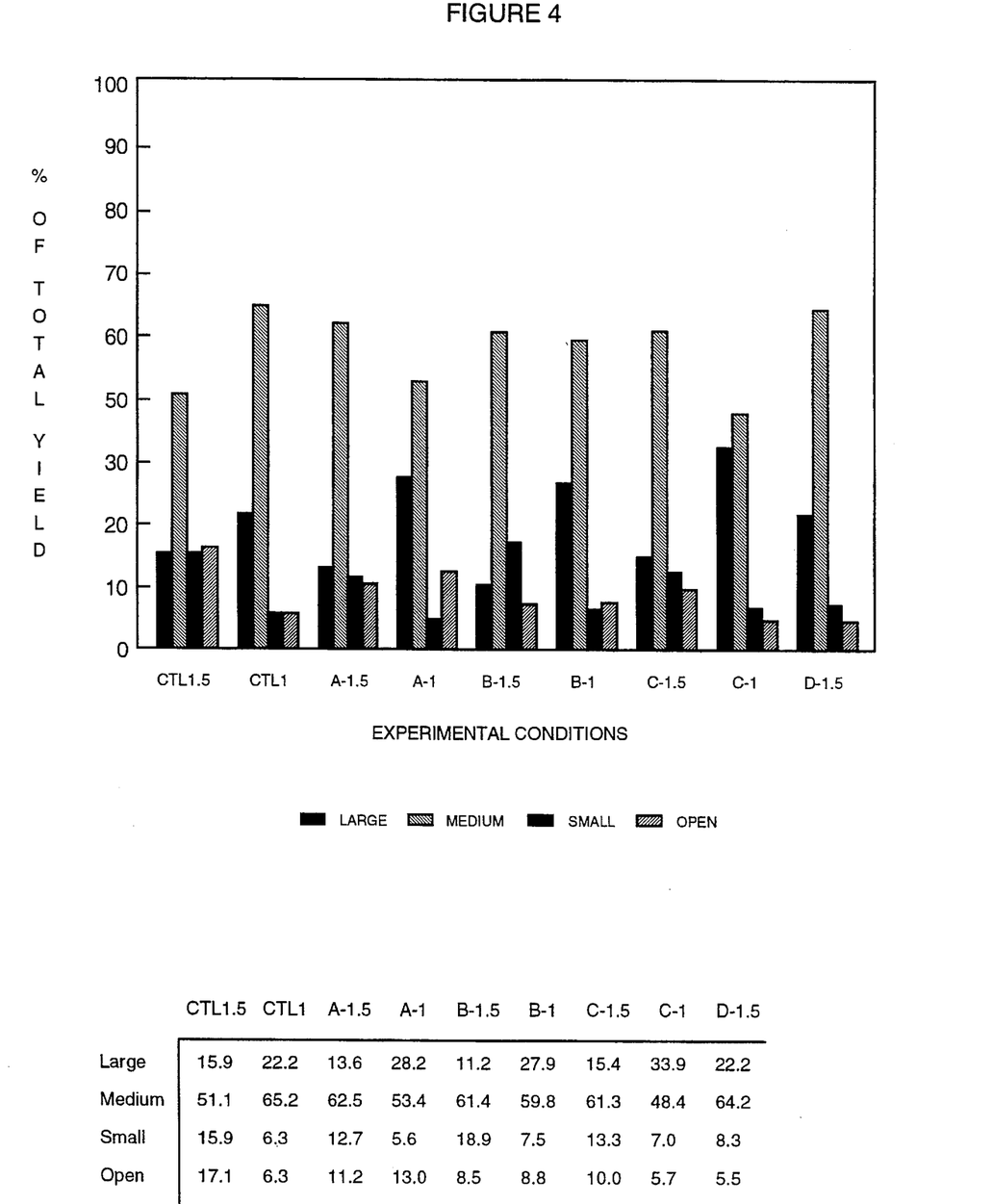
FIG. 4 further extends the comparisons of FIG. 2 to size distributions in terms of percentage of total yield.

TEST TRAY DESCRIPTIONS FOR FIGS. 2–4

| KEY | DESCRIPTION | PEAT DEPTH |
| --- | --- | --- |
| CTL1.5 | peat control, no polymer | 1.5" |
| CTL1 | peat control, no polymer | 1" |
| A-1.5 | 1% on compost, polyacrylamide | 1.5" |
| A-1 | 1% on compost, polyacrylamide | 1" |
| B-1.5 | 0.5% in peat, polyacrylamide | 1.5" |
| B-1 | 0.5% in peat, polyacrylamide | 1" |
| C-1.5 | 1.0% in peat, polyacrylamide | 1.5" |
| C-1 | 1.0% in peat, polyacrylamide | 1" |
| D-1.5 | 2.0% in peat, polyacrylamide | 1.5" |
| D-1 | 2.0% in peat, polyacrylamide | 1" |

While the principles of this invention have been described in connection with specific embodiments, it should be understood clearly that these descriptions are made only by way of example and are not intended to limit the scope of the invention, in any manner. For example, the techniques, media, and methods described herein can be employed by those skilled in the art in an analogous fashion to optimize growth conditions and/or yields of a variety of other agricultural crops. Consistent with the scope of the invention, tomato seedlings and other immature vegetable, ornamental, turf, and/or fruit plants having critical water and moisture retention requirements, and cultivated commercially via transplant or hydroseeding procedures, can benefit through use of the substantially linear, water-soluble polymers described herein. Media for enhancing such growth and availability of water include about 0.1–5.0 weight percent linear polymer, and preferably about 0.5–2.0 weight percent, based on the growth matrix used. Likewise, the invention may be used in conjunction with mushroom composting to improve the availability of the nutrients within the compost and/or otherwise enhance mushroom yields. In a similar fashion, the media, methods, and casing materials of the present invention can include the presence or addition of other nutrients, amendments, and related growth improvement aids. Other advantages and features of the invention will become apparent from the claims hereinafter, with the scope of the claims determined by the reasonable equivalents as understood by those skilled in the art.

What is claimed is:

1. A medium for enhancing growth and availability of water during a mushroom life cycle, comprising a synthetic resin and a casing material, said casing material selected from the group consisting of peat moss, compost, reclaimed compost, and combinations thereof, and said resin consisting essentially of a substantially-linear water-soluble polymer capable of forming a water-absorbing network within said casing material, such that said polymeric resin is dispersed within said casing material upon exposure to water and retains water for mycelia to mushroom growth progression.

2. The medium as defined in claim 1 wherein said polymer comprises monomers selected from the group consisting of acrylic acid, methacrylic acid, maleic anhydride, carboxy functional equivalents of acrylic acid, methacrylic acid,, maleic anhydride and combinations thereof, said monomers maintaining the water-solubility of said polymer.

3. The medium as defined in claim 2 wherein said polymer is a copolymer of at least two of said monomers.

4. The medium as defined in claim 2 wherein said polymer is a homopolymer of acrylamide.

5. The medium as defined in claim 1 wherein said polymer is about 0.1–5.0 weight percent.

6. The medium as defined in claim 5 wherein said polymer is about 0.5–2.0 weight percent.

7. The medium as defined in claim 1 wherein said polymer is a homopolymer of acrylamide at about 0.1–5.0 weight percent.

8. The medium as defined in claim 7 comprising peat moss and about 0.1–5.0 weight percent acrylamide homopolymer.

9. The medium as defined in claim 7 comprising peat moss and about 0.5–2.0 weight percent acrylamide homopolymer.

10. A material for facilitating mycelia development, comprising a casing selected from the group consisting of peat moss, compost, reclaimed compost, and combinations thereof, and a synthetic resin dispersed in said casing, said resin consisting essentially of a substantially linear, water-soluble acrylamide homopolymer, such that mycelia grow through said material along said substantially linear homopolymer.

11. The material as defined in claim 10 further including ground limestone.

12. The material as defined in claim 11 wherein said acrylamide homopolymer is about 0.1–5.0 weight percent.

13. The material as defined in claim 12 wherein said acrylamide homopolymer is about 0.5–2.0 weight percent.

14. A method for promoting mushroom development from a spawn medium, comprising:

providing a casing material, said material selected from the group consisting of peat moss, compost, reclaimed compost, field soil, and combinations thereof;

dispersing within said casing material a substantially linear water-soluble polymer capable of forming a water-absorbing network within said casing material; and applying water to said casing material such that the water is absorbed by said polymer for subsequent release responsive to mushroom growth.

15. The method as defined in claim 14 wherein said polymer is comprised of monomers selected from the group consisting of acrylic acid, methacrylic acid, maleic anhydride, carboxy functional equivalents of acrylic acid, methacrylic acid,, maleic anhydride and combinations thereof, said monomers maintaining the water-solubility of said polymer.

16. The method as defined in claim 15 wherein said polymer is a copolymer of at least two of said monomers.

17. The method as defined in claim 15 wherein said polymer is a homopolymer.

18. The method as defined in claim 14 wherein said casing material is peat moss, and said polymer is an acrylamide homopolymer at about 0.1–5.0 weight percent of said peat moss.

19. The method as defined in claim 14 further including adding ground limestone to said casing material in an amount sufficient to provide a predetermined pH.

20. The method as defined in claim 14 wherein said polymer is dissolved in water and added to said moistened casing material.

* * * * *